Jan. 17, 1939.　　　P. G. HARDING　　　2,143,981
UNIVERSAL HAND SAW
Filed Dec. 3, 1936
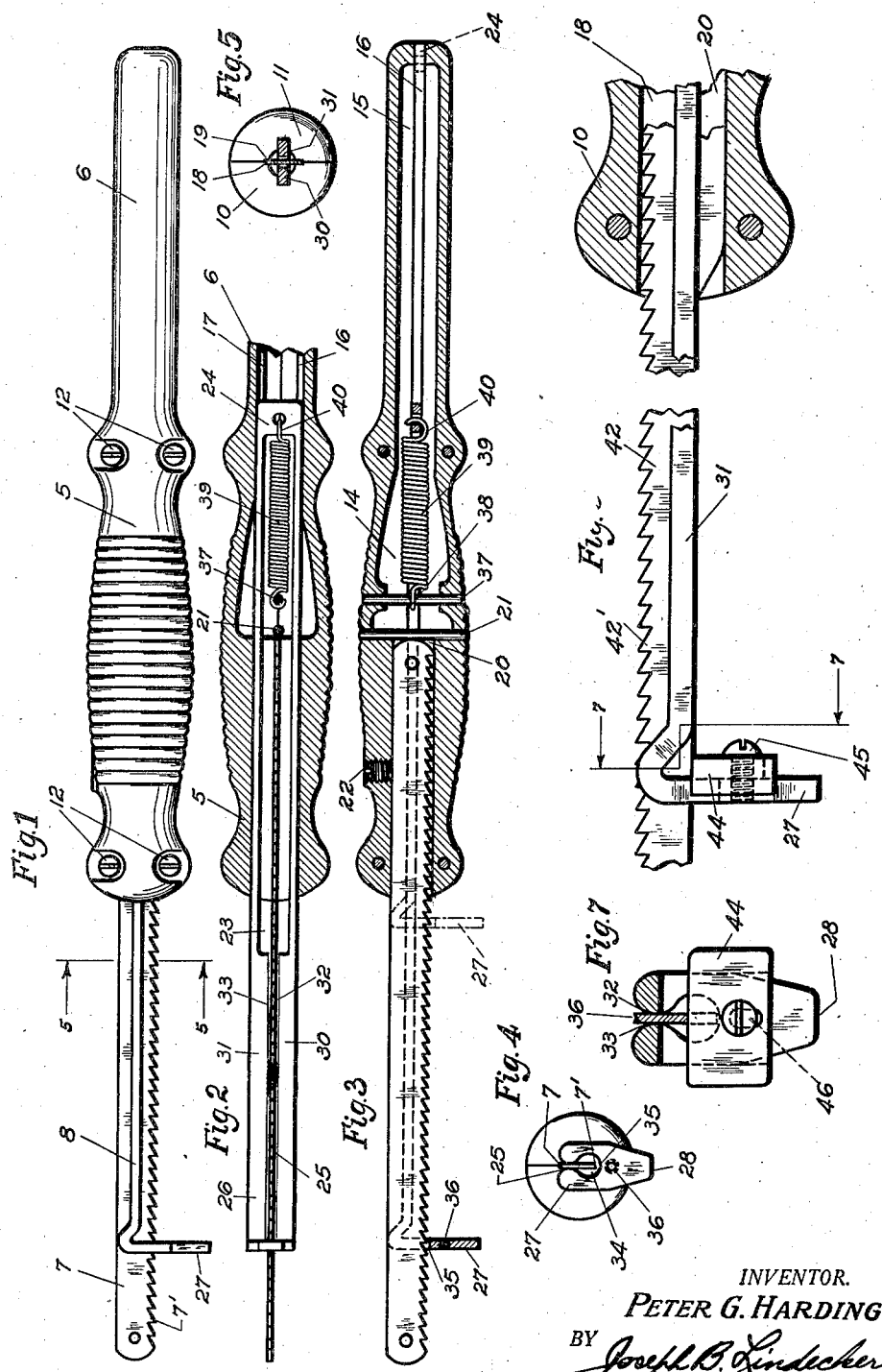
INVENTOR.
PETER G. HARDING
BY Joseph B. Lindecker
ATTORNEY.

Patented Jan. 17, 1939

2,143,981

UNITED STATES PATENT OFFICE 2,143,981

UNIVERSAL HAND SAW

Peter G. Harding, Chicago, Ill.

Application December 3, 1936, Serial No. 114,052

1 Claim. (Cl. 145—31)

This invention relates to improvements in hand saws, and more specifically to hack saws having reciprocating guards adapted to protect the saw blades.

An object of my invention is to provide a hand saw having a guard for the saw blade thereof, the guard being spring tensioned within the handle and arranged, constructed and adapted to be displaced from its protecting position when the saw is brought into operative relation with the work.

Another object of my invention is to provide a saw of the class described having a saw blade guard which is adapted to be displaced from its normal blade protecting position by reciprocating or sliding back and forth along the sides of the saw blade whenever the outer end of said guard is brought into engagement with the surface of the work and the saw blade brought into operative relation with the work and moved reciprocatively.

Another object of the invention is to provide the saw with a saw blade guard having a surface plate of novel shape or configuration arranged at right angles to the axis of the guard, extending rearwardly or away from the toothed cutting edge, providing sliding contact and lateral support with the sides of the blade and vertical support with the smooth edge or back of the blade, as the blade is brought into operative relation with the work and moved reciprocatively, the plate further providing means so that the line on the work surface can readily be seen at all times.

Another purpose of the invention is to provide means whereby the saw blade can be reversed should it be desirable to have a portion of the guard surface plate extend ahead of the toothed cutting edge of the saw blade.

Another object of the invention is to provide a saw of the class described having a saw blade guard adapted to bear upon and be displaced by the work, the guard comprising an anti-friction device, and further equipped with adjustable features relative to the sides and one edge of the saw blade so that saw blades of various sizes may be accommodated.

Another object of the invention is to provide a hand saw with a saw blade guard of the class described having a strong but light hollow handle and an axially extended body portion mounted in line with the axis of the toothed cutting saw blade so that the guard protecting said saw blade is supported by and a portion thereof is enclosed thereby, said hollow handle and body extension embodying guard channels or grooves to enable the saw blade guard to travel back and forth within said hollow handle as the handle is moved toward and the saw blade brought into operative relation with the work and moved reciprocatively.

Other objects such as simplicity, compactness and ease of operation, together with the foregoing, are attained by the novel construction, combination and arrangement of parts hereinafter described and shown in the accompanying drawing, forming part hereof and in which:—

Figure 1 is a side view of my improved universal hand saw.

Figure 2 is a fragmentary bottom view of my improved hand saw with parts in section for the purpose of clearer illustration.

Figure 3 is a longitudinal section of my improved hand saw as shown in Figure 1.

Figure 4 is an end elevation of my improved hand saw.

Figure 5 is a sectional view taken on line 5—5 of Figure 1, looking in the direction of the arrows.

Figure 6 is an enlarged fragmentary side view of a modified form of my invention.

Figure 7 is sectional view taken on line 7—7 of Figure 6, looking in the direction of the arrows.

Similar characters of reference indicate similar parts throughout the several views.

Referring to Figure 1, the reference character 5 designates the handle, the body extension of my improved saw being indicated at 6, the saw blade being indicated at 7, the saw blade guard being indicated at 8.

The handle 5 and body extensions 6 preferably are composed of two parts or members 10 and 11, said members secured to each other by bolts 12, the members 10 and 11 being adapted and constructed to form a hollow handle 14 and chamber 15. Provided in the hollow handle 14 and chamber 15 are channels or grooves 16 and 17 formed in members 10 and 11 respectively and extending throughout the entire length of both members 10 and 11, said grooves 16 and 17 jointly forming guide ways for the saw blade guard.

Also provided in the hollow handle 14 are channels or grooves 18 and 19 formed in members 10 and 11 respectively, parallel with but spaced 90 degrees from the grooves 16 and 17 to form jointly a saw blade slot further designated as 20; said slot being substantially the same shape in cross-section but slightly larger than the saw to assist in holding said saw blade in position. Said saw blade being prevented from penetrating too far into the hollow handle 14 by means of a stop pin 21 and being locked in place by set screw 22.

The saw blade guard 8 preferably is composed of one member or one piece of metal having a longitudinal opening 23 in the enclosed end portion thereof designated at 24 and a saw slot or groove 25 in the opposite end portion designated at 26, said end portion 26 terminating in a surface plate 27 of novel shape or configuration and arranged at right angles to the axis of the guard portion 24 and 26, and extending downwardly or away from the saw blade 7 forming a closed guard end 28, the surface plate 27 forming substantially a U shaped member. The opening 23 and saw slot 25 cause the saw guard to appear as having substantially two arms 30 and 31 with bearing surfaces 32 and 33 to give lateral support to the saw blade, the outer end of the saw blade slot being enlarged as shown at 34, to form the clearance for the cutting edge 7' of said saw blade. The base of said opening as designated at 35 is designed to give vertical support to the smooth edge or back of a saw blade when the saw blade is inverted or arranged so that the cutting edge 7' extends away from said closed end 35 of the surface plate 27.

The surface plate 27 is further provided with a tapped hole 36 to accommodate auxiliary attachments as will later be explained.

The handle 5 is provided with a pin 37 embodied therein to form a support or attaching means for one end 38 of a tension spring 39, the opposite end 40 of said spring 39 being secured to end portion 24 of guide 8, said spring 39 is normally disposed within the hollow handle 14 but stretches or extend rearwardly into chamber 15 when the saw blade guard is forced back into chamber 15 during the operation of said saw. The surface plate 27 at the opposite end of the saw guard under said conditions is displaced from its normal position as indicated by the dotted lines in Figure 3.

In Figures 6 and 7 I have illustrated a modified type of saw blade designated at 42 and secured within the saw blade slot 20, having its toothed cutting edge 42' remote from the closed end 28 of saw blade surface plate 27. The surface plate 27 has a supporting block or member 44 adjustably secured thereto by bolt 45 extending through elongated slot 46 in member 44 and into tapped hole 36 provided for the same, said member 44 arranged to supply the desired vertical support to the smooth edge or back of the saw blade 42 as shown.

From the above disclosure one will note that the saw will function as follows:—When a cut is to be made by the saw as described, the operator will grasp the handle 5 of said saw and position the saw blade guard surface plate 27 against the work. As the operator presses the saw forward and into contact with the work to produce the desired cut, the saw blade guard 8 slides automatically rearwardly within the hollow handle 14 and body extension 15 exposing the blade 7 to the desired extent. As the operator retracts or withdraws the saw blade 7 from the material, the saw blade guard 8 will again automatically be forced to its normal position outside the handle and in sliding contact with the saw blade by the natural action of the tension spring 39 within the handle. Continued reciprocation of the saw will cause the saw guard to automatically give lateral support to the sides of the saw blade and vertical support thereto when desired.

Although I have described but two forms of my invention with considerable detail and with respect to certain particular adjustable features, I do not desire to be limited to such details since many changes and modifications may well be made without departing from the spirit and scope of my invention in its broadest aspect.

Having thus described my invention, what I claim as new and desire to secure by Letters Patent, is:—

In a saw, the combination with a handle having its rear end portion substantially hollow and its forward end portion substantially solid, said forward end portion having two longitudinal slots at right angles to each other, one vertical and one horizontal, the vertical slot having a cross section substantially the same as that of a saw blade and adapted to receive and secure a saw blade therein, the horizontal slot adapted to receive, and provide a groove for, a reciprocating saw blade guard, said guard having an aperture therein providing a slot for the passage of said saw blade and terminating into a surface plate at its outer end, said plate formed at right angles to the plane of the body portion of said guard, a spring member enclosed within the hollow portion of said handle, one end of said spring being attached to said handle by suitable means and the opposite end of said spring being attached to the inner end of said guard to cause said guard to be spring tensioned.

PETER G. HARDING.